United States Patent [19]
Khan et al.

[11] Patent Number: 5,646,632
[45] Date of Patent: Jul. 8, 1997

[54] METHOD AND APPARATUS FOR A PORTABLE COMMUNICATION DEVICE TO IDENTIFY ITS OWN LOCATION

[75] Inventors: Muzibul H. Khan, Marlboro, N.J.; Joseph Boccuzzi, Brooklyn, N.Y.

[73] Assignee: Lucent Technologies Inc., Murray Hill, N.J.

[21] Appl. No.: 338,911

[22] Filed: Nov. 14, 1994

[51] Int. Cl.$^6$ .................................................. H01Q 3/22
[52] U.S. Cl. .................... 342/375; 342/457; 342/367; 455/524; 455/575; 370/335; 370/500
[58] Field of Search ..................... 342/457, 450, 342/375, 367; 455/54.1, 56.1, 67.6, 89

[56] References Cited

U.S. PATENT DOCUMENTS

| | | | |
|---|---|---|---|
| 4,092,600 | 5/1978 | Zimmermann et al. | 325/55 |
| 4,775,995 | 10/1988 | Chapman et al. | 379/58 |
| 5,164,732 | 11/1992 | Brockelsby et al. . | |
| 5,196,846 | 3/1993 | Brockelsby et al. . | |
| 5,293,645 | 3/1994 | Sood . | |
| 5,339,353 | 8/1994 | Asahara et al. | 379/59 |
| 5,365,451 | 11/1994 | Wang et al. | 364/449 |
| 5,465,388 | 11/1995 | Zicker | 455/33.1 |

OTHER PUBLICATIONS

Stewart, J.M, "Vehicle Location and Position Monitoring System Using Satellite Navigation and Cellular Telephone," IEE Colloquium Vehicle Location Fleet Management Systems, Digest No. 112, 1993.

Whipple, D.P., "North American Cellular CDMA," Hewlett–Packard Journal, Dec. 1993, pp. 90–97.

Yi, B., and Last, D., "Loran–C Receiver Signal Processing and Multiple Sampling Techniques," Proc. of the Third Bangor Symposium on Communications, 1991.

*Primary Examiner*—Thomas H. Tarcza
*Assistant Examiner*—Dao L. Phan

[57] ABSTRACT

A method and apparatus for a portable communication device, such as a mobile radio terminal in a CDMA network, to identify its geographic location. A communication network comprises multiple base stations which transmit pilot signals, where the pilot signals of one base station are offset from the pilot signals of other base stations by integral multiples of a substantially fixed duration. Associated sync channel messages are also transmitted from which the geographic location of the base stations may be extracted. A portable communication device identifies its location by calculating the delay between the arrival time of a pilot signal from a primary base station and the arrival times of pilot signals from at least two other base stations. For each pair of base stations corresponding to one of the calculated delays, the portable communication device initially specifies its location as being on a selected one of three curves. The current location of the portable communication device is identified based upon points of intersection of the selected curves. The identified location may be stored in, transmitted from, or displayed at the portable communication device.

22 Claims, 3 Drawing Sheets

U.S. Patent     Jul. 8, 1997     Sheet 1 of 3     5,646,632 ical radio network in which the present invention is particularly advantageous.

METHOD AND APPARATUS FOR A PORTABLE COMMUNICATION DEVICE TO IDENTIFY ITS OWN LOCATION

FIELD OF THE INVENTION

The present invention relates generally to radio communication systems, such as CDMA cellular telephone networks, and, in particular, to a method and apparatus for a portable communication device to identify its own location within such a system.

BACKGROUND OF THE INVENTION

Mobile or portable radio terminals in cellular networks permit users of such radio terminals to move from place to place within a geographic area and maintain or establish a communication channel with base stations in the network. The base stations are typically connected to an existing telephone network, thereby providing access to a larger telecommunication system.

Situations often arise where it is desirable to determine the location of a mobile or portable radio terminal. Such situations may arise, for example, in the event of a medical or safety emergency so that help may be dispatched. Similarly, it may be desirable to track a radio terminal as it moves within a particular geographic area for the purpose of tracking assets or people that are travelling with the radio terminal.

Several techniques are known for locating a mobile or portable radio terminal. Loran-C receivers, for example, use a radio pulsed navigation system. Another proposed technique would use the Global Positioning System (GPS) in conjunction with a cellular telephone network. The GPS, however, is a satellite based navigation and positioning system and does not perform well inside buildings. Furthermore, the system would require that a user have both a GPS receiver as well as cellular telephone service.

Another technique for locating a mobile or portable radio terminal is disclosed in U.S. Pat. No. 5,293,645. The disclosed method involves compiling relative propagation delays for synchronized timing signals transmitted from a plurality of base stations in a cellular network and received by the radio terminal to be located. The radio terminal then transmits the compiled information to a base station or other unit in the network where the location of the radio terminal is identified. One feature of the disclosure of the aforementioned patent is that in order to identify the location of the radio terminal, the radio terminal must transmit information to a unit in the network that is external to the radio terminal. Furthermore, according to the disclosure of the aforementioned patent, the user of the radio terminal does not have immediate access to its location.

SUMMARY OF THE INVENTION

The present invention discloses a method and apparatus for identifying the location of a mobile or portable radio terminal in a cellular telephone network that does not require that the radio terminal transmit information to other units in the network. According to the principles of the present invention, a radio terminal in the network can determine its own location in a manner that uses the existing framework of code division multiple access (CDMA) technology and thus requires no modification of current CDMA protocols.

The portable communication device of the present invention may suitably comprise a receiver and a transmitter. It may also comprise a relative delay calculation unit, coupled to the receiver, for computing delays between the arrival time of a pilot signal transmitted from a primary base station and the arrival times of pilot signals transmitted from at least two other base stations. The device may also have a memory unit, coupled to the receiver, for storing information indicative of the location of the primary base station and the other base stations whose pilot signals were received. In addition, the device may suitably include a processor, coupled to the relative delay calculation unit and the memory unit, where the processor is programmed to identify the location of the portable communication device.

Other features and advantages of the present invention will be readily apparent by reference to the following detailed description and accompanying drawings.

DETAILED DESCRIPTION

Figure 1:
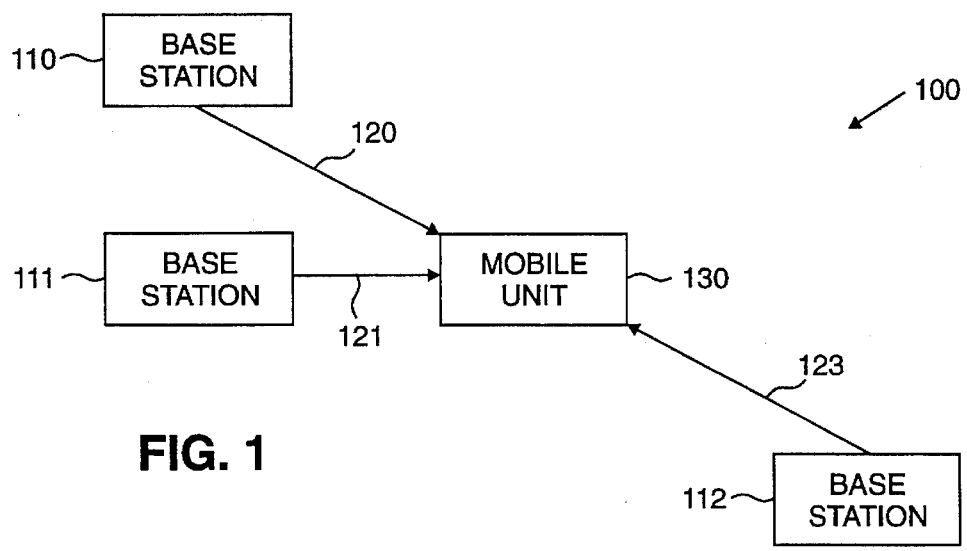
FIG. 1 is a block diagram of a cellular radio network in which the present invention is particularly advantageous.

FIG. 1 is a block diagram of a cellular radio network 100 in which the present invention is particularly advantageous. The network 100 preferably is a code division multiple access (CDMA) network, which includes a plurality of base stations 110, 111 and 112. Although only three base stations are shown in the network 100 of FIG. 1, a typical CDMA network may have many more base stations. The base stations 110–112 are connected via a communication link, as is well known in the art. Also, as is well known in the art, each base station in the CDMA network 100 generates and transmits pilot signals or reference timing signals in a synchronous manner within the tolerances of the synchronization technique. The pilot signals or reference timing signals are known periodic sequences of bits, which may be modulated, for example, according to the CDMA standard. The pilot signals transmitted by one base station, such as the base station 110, are offset in time by integral multiples of a fixed duration with respect to the pilot signals transmitted by other base stations in the network 100. The fixed duration may be referred to as a staggered pilot signal transmission time and may be represented by the symbol Δ. The staggered pilot signal transmission time is substantially constant within the tolerances of the system. Thus, the start of a sequence of bits representing a pilot signal transmitted by one base station is offset from the start of sequences of bits representing pilot signals transmitted by other base stations by an integral multiple of the staggered pilot signal transmission time. The time offset allows the pilot signals of one base station to be distinguished from those of other base stations.

The base stations 110–112 provide a network by which a mobile or portable radio terminal 130 within the network 100 can link up with a telecommunication network. In the present specification, a portable communication device, such as the mobile or portable radio terminal 130, will be generically referred to as a mobile. Pilot signals transmitted by the base stations 110–112 and received at the mobile 130 are represented in FIG. 1 by the lines 120–122, respectively. It should also be noted that the staggered pilot signal transmission time will typically be several orders of magnitude greater than the propagation time of the pilot signals from the base stations 110– 112 to the mobile 130. The staggered pilot signal transmission time Δ may be stored permanently in a memory in the device 130.

Figure 2:
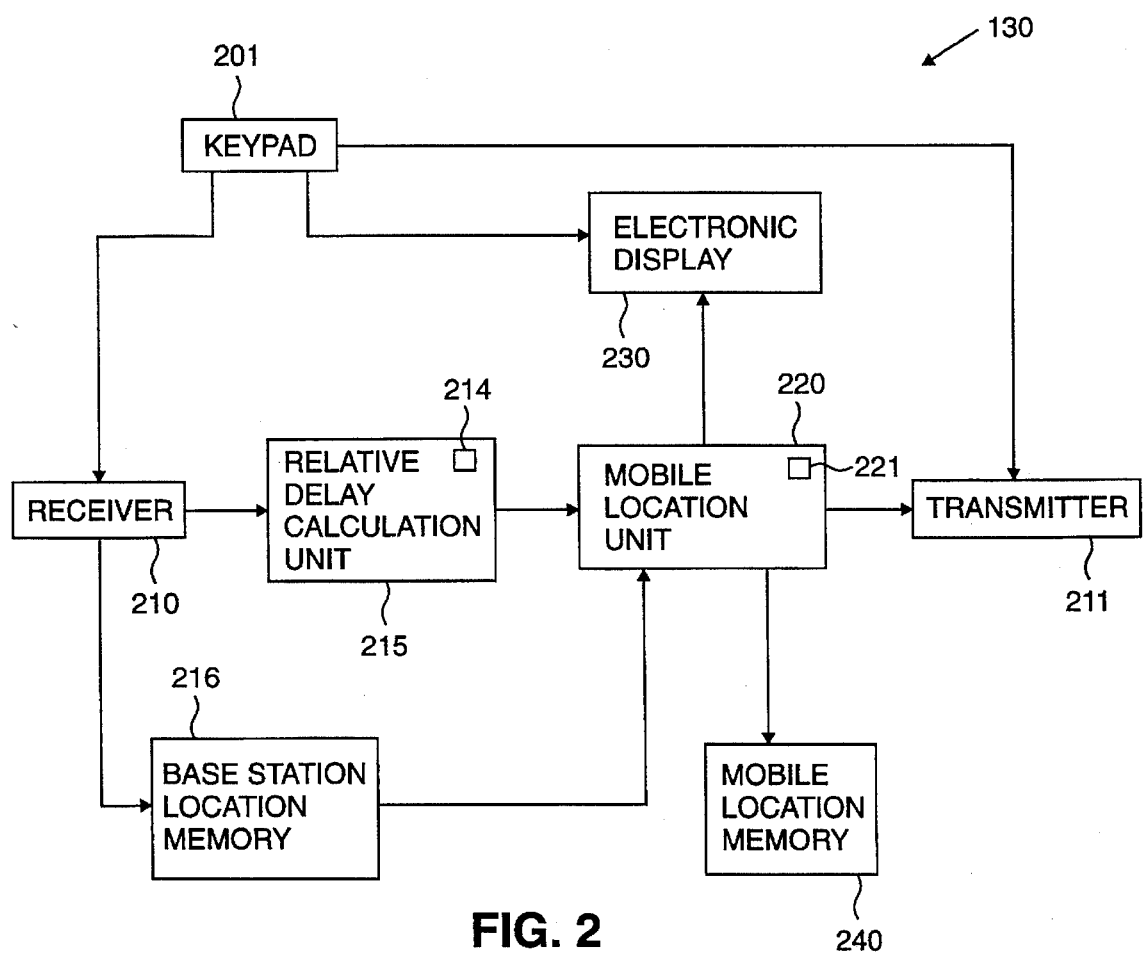
FIG. 2 is a block diagram of a mobile according to the principles of the present invention.

FIG. 2 is a block diagram of the mobile 130 according to the principles of the present invention. The mobile 130 preferably comprises a keypad 201, a handset or other device which allows a user to instruct the mobile 200 to determine or identify its location. Alternatively, the mobile 130 may be designed to respond to an instruction originating from other sources in the network. In yet a further embodiment, the mobile 130 may be programmed to identify automatically its location on a periodic basis.

The keypad 201 is coupled to a receiver 210 which is tuned to detect pilot signals from the base stations. Upon receiving the instruction to identify the location of the mobile 130, the mobile 130 searches for pilot signals. In a preferred embodiment, the mobile 130 locks onto the strongest pilot signal. The base station whose pilot signal is strongest then serves as a primary base station, although other base stations, such as the base station whose pilot signal is received first, may also serve as the primary base station. The mobile 130 continues to search for pilot signals from other base stations as well.

The mobile 130 further comprises a relative delay calculation unit 215 which is coupled to the receiver 210. The relative delay unit 215 includes a timer or clock 214 which records the time at which each pilot signal is received. Once pilot signals from at least three base stations have been received, the relative delay calculation unit 215 computes the delay between the arrival time of the pilot signal transmitted from the primary base station and the arrival times of the pilot signals transmitted from the other base stations. Alternatively, the timer 214 may begin running when the pilot signal from the primary base station is received. As subsequent pilot signals from other base stations are received, the relative delay calculation unit records the time that has passed since the pilot signal from the primary base station was received. The relative delay calculation unit 215 thus determines the delay between the arrival time of the pilot signal transmitted from the primary base station and the arrival time of the pilot signals transmitted from at least two other base stations.

The mobile also extracts information contained in a sync channel message associated with each base station whose pilot signal is received. Specifically, the mobile 130 would extract information indicating the geographical location or coordinates of each base station whose pilot signal is received. The geographical coordinates of the base stations may be stored, at least temporarily, in a base station location memory unit 216 for further use as explained below.

A mobile location unit 220 is coupled to the relative delay calculation unit 215 and the base station memory 216 so as to receive signals indicating the calculated delays between arrival times of the pilot signals and the coordinates of the base stations. The mobile location unit 220 and the relative delay calculation unit 215 may be implemented by an appropriately programmed microprocessor. For each pair of base stations corresponding to one of the computed delays, the mobile location unit 220 specifies the location of the mobile 130 as being located on a selected one of three curves, as illustrated in FIG. 3.

Figure 3:
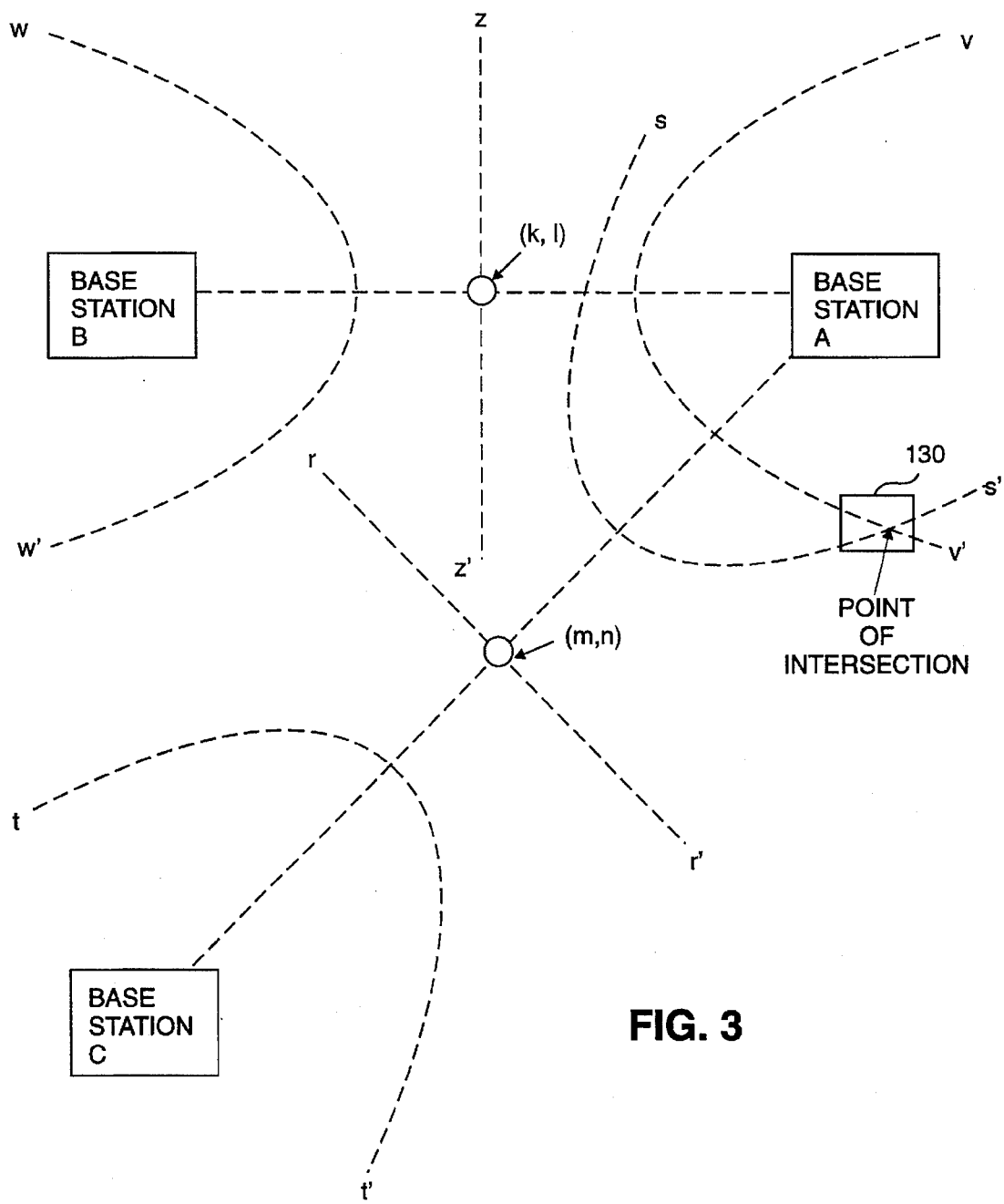
FIG. 3 illustrates a technique for identifying the location of a mobile according to the principles of the present invention.

FIG. 3 illustrates a technique for identifying the location of a mobile according to the principles of the present invention. FIG. 3 shows the mobile 130 which has received pilot signals from at least three base stations labelled A, B and C. For the purpose of illustration, it will be assumed that the base station A is the primary base station. Furthermore, it will be assumed that the mobile 130 has calculated a delay $T_{AB}$ between the arrival times of the pilot signals transmitted from the base stations A and B respectively. It will also be assumed that the mobile 130 has calculated a delay $T_{AC}$ between the arrival times of the pilot signals transmitted from the base stations A and C respectively.

With respect to the pair of base stations A and B corresponding to the delay $T_{AB}$, the first curve is defined by a straight line zz' which bisects and runs perpendicular to a line drawn from the base station A to the base station B. The second and third curves, vv' and ww', respectively, are defined as the points (x, y) that satisfy the following equation:

$$\frac{(x-k)^2}{a^2} - \frac{(y-l)^2}{b^2} = 1$$

where k and l are the horizontal and vertical coordinates, respectively, of the midpoint between the line that intersects the base stations A and B. Also in the above equation, the term 'a' equals the product of the delay $T_{AB}$ and the radio propagation velocity, divided by a factor of two. In the above equation, the term 'b²' equals the product of a² and (e²−1), where the term 'e' equals the distance between the point (k, l) and the base station A, divided by 'a'.

The mobile location unit 220 would then specify the mobile 130 as being located on a selected one of the three curves zz', vv' or ww', based upon the relative values of the delay $T_{AB}$ and the actual duration $\Delta_{AB}$ between the transmission times of the pilot signal from the base station A and the pilot signal from base station B. Although the mobile 130 does not know the actual duration $\Delta_{AB}$ between the transmission times, it can estimate that value by determining which integral multiple of the staggered pilot signal transmission time Δ is closest to the value $T_{AB}$. Thus, if $T_{AB}$ is equal to $\Delta_{AB}$, then the mobile location unit 220 identifies the mobile 130 as being located on the curve zz'. If $T_{AB}$ is greater than $\Delta_{AB}$, then the mobile location unit 220 identifies the mobile 130 as being located on the hyperbola vv'. Finally, if $T_{AB}$ is less than $\Delta_{AB}$, the mobile location unit 220 identifies the mobile 130 as being located on the curve ww'.

In a preferred embodiment, assuming that the pilot signals of the various base stations in the network are transmitted at the same power, the mobile location unit 220 would specify the mobile 130 as being located on one of the three curves based upon the relative strength or power of the received pilot signals. Specifically, the mobile location unit 220 would identify the mobile 130 as being located on the hyperbola which is closer to the base station whose received pilot signal was stronger. If the strength of the received pilot signals were the same, within the tolerances of the system, then the mobile location unit 220 would identify the mobile 130 as being located on the line zz'. For the purpose of illustration, it will be assumed that the mobile location unit 220 specifies the mobile 130 as being located on the selected curve vv'.

The mobile location unit 220 would then specify, in a similar manner, the mobile 130 as being on a selected one of three similar curves, using the delay $T_{AC}$ between arrival times of the pilot signals transmitted from the base stations A and C, and using the coordinates of the base stations A and C.

With respect to the pair of base stations A and C corresponding to the delay $T_{AC}$, the first curve is defined by a straight line rr' which bisects and runs perpendicular to a line drawn from the base station A to the base station C. The second and third curves, ss' and tt', respectively, are defined as the points (x, y) that satisfy the following equation:

$$\frac{(x-m)^2}{f^2} - \frac{(y-n)^2}{g^2} = 1$$

where m and n are the horizontal and vertical coordinates, respectively, of the midpoint between the line that intersects the base stations A and C. Also in the above equation, the term 'f' equals the product of the delay $T_{AC}$ and the radio propagation velocity, divided by a factor of two. In the above equation, the term 'g²' equals the product of f² and (h²−1), where the term 'h' equals the distance between the point (m, n) and the base station A, divided by 'f'.

As before, the mobile location unit 220 would then specify the mobile 130 as being located on a selected one of the three curves rr', ss' or tt' based upon the relative values of the delay $T_{AC}$ and the actual duration $\Delta_{AC}$ between the transmission times of the pilot signal from the base station A and the pilot signal from base station C. The mobile 130 can estimate the value of $\Delta_{AC}$ by determining which integral multiple of the staggered pilot signal transmission time Δ is closest to the value $T_{AC}$. Alternatively, in the preferred embodiment, the mobile location unit 220 would specify the mobile 130 as being located on one of the three curves rr', ss' or tt', based upon the relative strength or power of the received pilot signals. Again, for the purpose of illustration, it will be assumed that the mobile location unit 220 specifies the mobile as being located on the selected curve ss'.

Finally, the point of intersection between the two selected curves represents the identified current location of the mobile 30. Thus, in the example illustrated in FIG. 3, the mobile location unit 220 would identify the geographic location of the mobile 130 as being at the point of intersection between the selected curves vv' and ss'.

Figure 4:
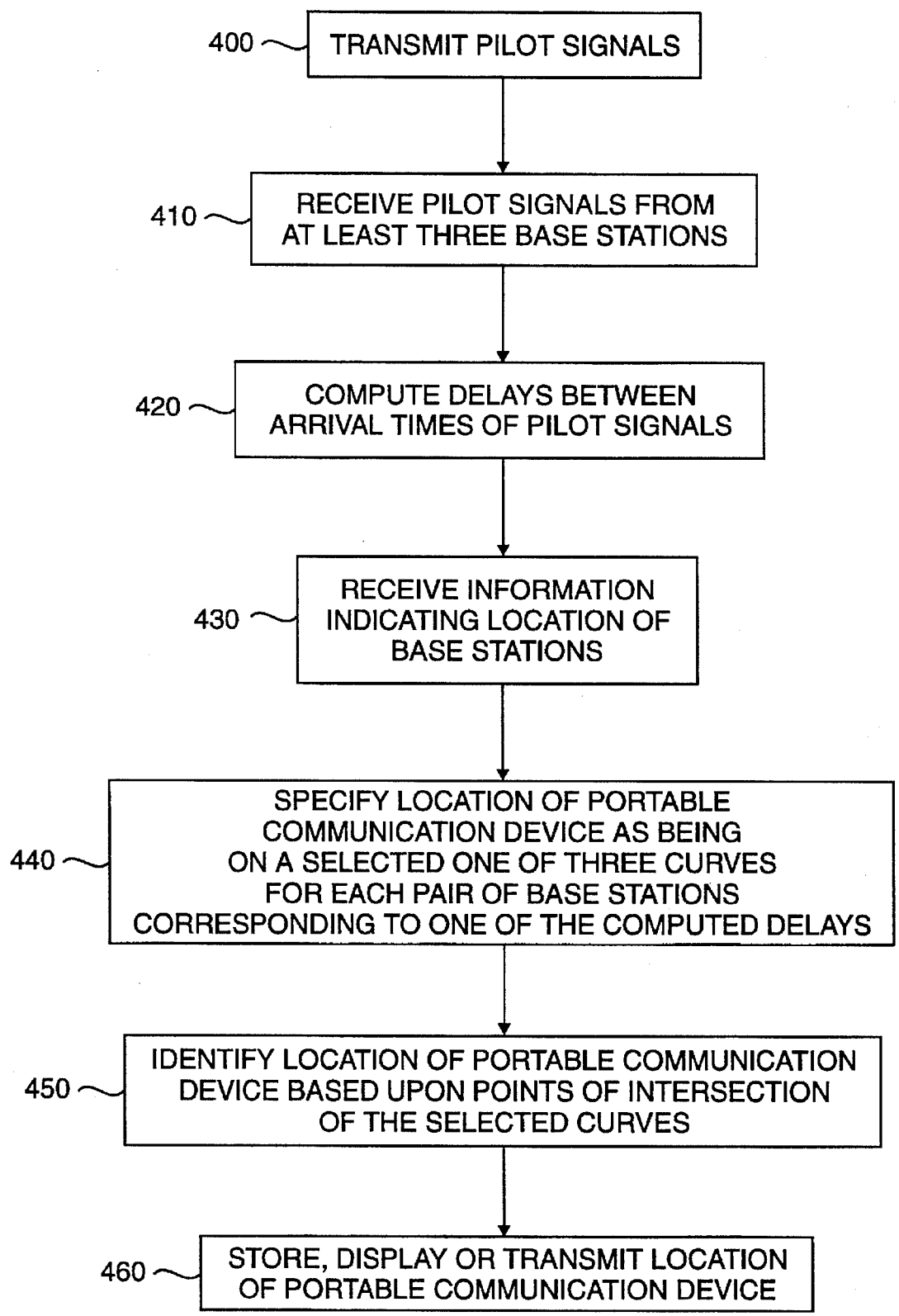
FIG. 4 is a flow chart illustrating the steps of identifying the location of a portable communication device according to the principles of the present invention.

FIG. 4 is a flow chart conveniently illustrating the steps of identifying the location of a portable communication device, such as the mobile 130, according to the principles of the present invention. As shown in step 400, a plurality of at least three base stations, such as the base stations A, B and C in FIG. 3, transmit pilot signals in the manner described above. Next, as indicated by step 410, the portable communication device receives pilot signals from at least three of the base stations. Referring again to FIG. 3, the mobile 130 would thus receive pilot signals from the base stations A, B and C. The portable communication device then computes the delays between the arrival time of a pilot signal transmitted from one of the base stations and the arrival times of pilot signals transmitted from at least two other base stations, as shown in step 420. With reference to the example illustrated in FIG. 3 and discussed above, the mobile 130 would compute the delays $T_{AB}$ and $T_{AC}$. As illustrated by step 430, the portable communication device also receives information indicative of the location of the base stations whose pilot signals were received. Again referring to FIG. 3, the mobile 130 would receive information indicative of the location of the base stations A, B and C. As explained above, this information may be obtained from sync channel messages associated with each pilot signal. Next, as indicated by step 440, for each pair of base stations corresponding to one of the computed delays, the geographic location of the portable communication device is specified as being on a selected one of three curves, thereby resulting in a plurality of selected curves. Referring again to the example illustrated in FIG. 3, the mobile 130 specifies its location as being on the selected curve vv' from among the three curves zz', ww' and vv' with respect to the pair of base stations A and B. Similarly, the mobile 130 specifies its location as being on the selected curve ss' from among the three curves rr', ss' and tt' with respect to the pair of base stations A and C. The geographic location of the portable communication device is identified based upon a point or points of intersection of the selected curves, as shown in step 450. Thus, in the example illustrated in FIG. 3, the mobile 130 would identify its geographic location as being at the point of intersection of the curves vv' and ss'. Finally, as shown in step 460, the location of the portable communication device may be stored in memory in the portable communication device, displayed on a display screen associated with the portable communication device, or transmitted to a remote location.

In particular, once the mobile location unit 220 has identified the location of the mobile 130, the identified location may be stored in a mobile location memory 240 for subsequent retrieval. In another embodiment, a transmitter 211, coupled to the mobile location unit 220, would automatically transmit the identified location to a remote location, such as a central tracking office, or to a location specified by the user according to information entered via the keypad 201. In yet another embodiment, the identified location would be displayed on an electronic or other display screen 230 coupled to the mobile location unit 220. The location would be displayed, for example, either as text or in the form of an electronic map. This embodiment would allow the location of the mobile to be made known to the user of the mobile. Applications of the present invention include, for example, navigation, the tracking of assets or people, and fleet management.

It should be noted that, according to the principles of the present invention, the absolute or actual delay between the transmission time and the arrival time of a pilot signal sent by any particular base station need not be determined or calculated. Rather, only the relative delays between arrival times are used. It should also be noted that the mobile 130 may need to receive several sequences of pilot signals in order to properly establish the sequence in which the base stations are transmitting their respective pilot signals. Receiving several sequences of pilot signals also allows the mobile 130 to use average delays between times of arrival. Thus, in a CDMA system, in which the pilot repetition rate is typically 37.5 Hertz, reception of pilot signals over a period of approximately eleven seconds appears adequate to obtain reliable results. Also, the pilot signals of more than three base stations may be used to improve the identification of the mobile's location. In such a situation, the selected curves for each computed delay and corresponding pair of base stations may intersect at more than one point due to the tolerances of the system. The mobile then may be located within the vicinity of the intersecting points by using a weighted function to estimate the precise location of the mobile.

Although the present invention has been described with reference to specific embodiments, it will be appreciated that other arrangements within the spirit and scope of the present invention will be readily apparent to persons of ordinary skill in the art. For example, it will be understood that different sets of curves may be used to specify and identify the location of the portable communication device. The present invention is, therefore, limited only by the appended claims.

We claim:

1. A portable communication device comprising:
   a receiver;
   a transmitter;
   a relative delay calculation unit, coupled to said receiver, for computing delays between the arrival time of a pilot signal transmitted from a primary base station and the arrival times of pilot signals transmitted from at least two other base stations;

a memory unit, coupled to said receiver, for storing information indicative of the location of said primary base station and said at least two other base stations; and a processor, coupled to said relative delay calculation unit and said memory unit, where said processor is programmed to identify the geographic location of said portable communication device.

2. The portable communication device of claim 1 wherein said receiver is tuned to detect pilot signals transmitted from base stations in a code division multiple access (CDMA) network.

3. The portable communication device of claim 1 wherein said information is extracted from sync channel messages associated with said pilot signals.

4. The portable communication device of claim 1 wherein the processor is programmed to identify the geographic location of said portable communication device based upon said delays and said information.

5. The portable communication device of claim 1 wherein said processor is coupled to said transmitter and wherein said transmitter transmits the geographic location of said portable communication device to a remote location.

6. The portable communication device of claim 1 further comprising a mobile location memory unit, coupled to said processor, which stores the geographic location of said portable communication device.

7. The portable communication device of claim 1 further comprising a display, coupled to said processor, which displays the geographic location of said portable communication device.

8. The portable communication device of claim 1 wherein said portable communication device is a mobile radio terminal.

9. A system for identifying the location of a portable communication device in a radio network, at least a portion of which comprises:

a plurality of at least three base stations in the radio network, each transmitting pilot signals which are offset in time by integral multiples of a substantially fixed duration with respect to pilot signals transmitted by each other base station in the network;

a receiver in said portable communication device;

a transmitter in said portable communication device;

a relative delay calculation unit, disposed in said portable communication device and coupled to said receiver, for computing delays between the arrival time of a pilot signal transmitted from a primary base station and the arrival times of pilot signals transmitted from at least two other base stations, where said primary base station and said at least two other base stations are among said plurality of at least three base stations;

a memory unit, disposed in said portable communication device and coupled to said receiver, for storing information indicative of the location of said primary base station and said at least two other base stations; and a processor, disposed in said portable communication device and coupled to said relative delay calculation unit and said memory unit, where said processor is programmed to identify the geographic location of said portable communication device.

10. The portable communication device of claim 9 wherein said base stations are part of a code division multiple access (CDMA) network.

11. The portable communication device of claim 9 wherein said information is extracted from sync channel messages associated with said pilot signals.

12. The system of claim 9 wherein the processor is programmed to identify the geographic location of said portable communication device based upon said delays and said information.

13. A method of operating a portable communication device so as to identify its location in a radio network, the method comprising the steps of:

receiving pilot signals from at least three base stations, where pilot signals transmitted by each base station are offset in time by integral multiples of a substantially fixed duration with respect to pilot signals transmitted by other base stations;

computing the delays between the arrival time of a pilot signal transmitted from one of said base stations and the arrival times of pilot signals transmitted from at least two other of said base stations;

receiving information indicative of the locations of the base stations whose pilot signals were received;

specifying, for each pair of base stations corresponding to one of said delays, the geographic location of said portable communication device as being on a selected one of three curves thereby resulting in a plurality of selected curves; and identifying the geographic location of said portable communication device based upon points of intersection of said plurality of selected curves.

14. The method of claim 13 further comprising the step of storing the geographic location of said portable communication device in memory associated with said portable communication device.

15. The method of claim 13 further comprising the step of displaying the geographic location of said portable communication device on a display screen associated with said portable communication device.

16. The method of claim 13 wherein the step of computing the delays comprises the step of computing average delays over several sequences of pilot signals.

17. The method of claim 13 wherein said three curves comprise two hyperbolas and one straight line.

18. The method of claim 13 wherein the step of transmitting pilot signals comprises the step of transmitting pilot signals in a code division multiple access (CDMA) network.

19. The method of claim 13 wherein the step of identifying comprises the step of identifying the geographic location of said portable communication device as being at a point of intersection of said plurality of selected curves.

20. The method of claim 13 wherein the step of identifying comprises the step of using a weighted function to estimate the precise geographic location of said portable communication device.

21. The portable communication device of claim 1 wherein said receiver is tuned to detect pilot signals transmitted from base stations in a code division multiple access (CDMA) network;

said information is extracted from sync channel messages associated with said pilot signals; and said processor rapidly calculates an average geographic location of said portable communication device over a predetermined period of time or for a predetermined number of samples to offset errors.

22. The method of claim 13 further comprising the step of transmitting the geographic location of said portable communication device to a remote location.

* * * * *